United States Patent
Harmelink et al.

(10) Patent No.: US 9,490,525 B2
(45) Date of Patent: Nov. 8, 2016

(54) RESILIENT ANTENNA MAST

(71) Applicant: Deere & Company, Moline, IL (US)

(72) Inventors: Gregory Harmelink, Moorhead, MN (US); Jon T. Jacobson, Fargo, ND (US); Michael A. Hajicek, West Fargo, ND (US); Brady P. Walter, West Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/579,027

(22) Filed: Dec. 22, 2014

(65) Prior Publication Data

US 2016/0181686 A1    Jun. 23, 2016

(51) Int. Cl.
*H01Q 1/20* (2006.01)
*H01Q 1/32* (2006.01)
*E05D 5/12* (2006.01)
*F16C 11/10* (2006.01)

(52) U.S. Cl.
CPC ............... *H01Q 1/20* (2013.01); *H01Q 1/32* (2013.01); *E05D 5/121* (2013.01); *F16C 11/103* (2013.01)

(58) Field of Classification Search
CPC .... F16M 11/28; F16M 11/2021; E05D 3/02; E05D 2005/122; E04D 5/121; F16C 11/103; H04R 1/08; H01Q 1/20; H01Q 1/32
USPC ............. 248/371, 162.1, 158, 122.1, 123.11, 248/125.2, 125.7, 688, 145, 156, 511, 900, 248/909, 550, 160, 519, 545, 530, 623; 403/202, 229, 203, 291
See application file for complete search history.

(56) References Cited

U.S. PATENT DOCUMENTS

| | | | | |
|---|---|---|---|---|
| 2,094,475 A | * | 9/1937 | Schwarzhaupt | H01Q 1/085 248/160 |
| 2,254,566 A | * | 9/1941 | Cornell, Jr. | F16D 3/72 248/160 |
| 2,949,324 A | * | 8/1960 | Birge | E01F 9/017 248/576 |
| 3,680,144 A | * | 7/1972 | Low | H01Q 1/288 343/781 R |
| 3,847,497 A | * | 11/1974 | Guillory, Sr. | E01F 9/0112 116/28 A |
| 3,868,080 A | * | 2/1975 | Olson | H01R 9/2441 174/38 |
| 3,899,150 A | * | 8/1975 | Racquet | A47G 29/1216 16/76 |
| 3,978,490 A | * | 8/1976 | Fletcher | H01Q 15/161 343/882 |
| 4,724,279 A | | 2/1988 | Ayscue | |
| 4,792,088 A | * | 12/1988 | Bonnell | E01F 9/0175 232/17 |
| 4,818,155 A | * | 4/1989 | Belknap | B25H 1/0035 173/36 |
| 5,029,783 A | * | 7/1991 | Alvarez | E01F 9/0175 232/39 |
| 5,149,282 A | * | 9/1992 | Donato et al. | F21V 15/04 248/160 |
| 6,149,340 A | | 11/2000 | Pateman | |
| 6,223,982 B1 | * | 5/2001 | Dunn | A47G 29/1216 232/39 |
| 6,267,529 B1 | * | 7/2001 | Mudryk | E01F 9/0175 116/63 R |
| 6,441,795 B1 | * | 8/2002 | Volman | H01Q 13/02 343/786 |
| 6,560,906 B1 | * | 5/2003 | Hillstrom | G09F 15/0056 248/548 |
| 6,606,074 B1 | * | 8/2003 | Allnutt | H01Q 9/16 343/797 |
| 6,669,515 B1 | | 12/2003 | Urban et al. | |
| 7,032,811 B1 | * | 4/2006 | Paulic | A47G 29/1216 232/39 |

(Continued)

*Primary Examiner* — Nkeisha Smith (57) ABSTRACT

In one embodiment, an antenna system comprises a lower mast member that has a first transverse member mounted in an interior of the lower mast member. An upper mast member has a second transverse member mounted in the interior of the upper mast member. A resilient member establishes a movable connection between the lower mast member and the upper mast member, in which the upper mast member can form a pivot angle with respect to the lower mast member. The resilient member is secured or retained axially by the first transverse member and the second transverse member.

20 Claims, 8 Drawing Sheets

(56) References Cited

U.S. PATENT DOCUMENTS

| | | | |
|---|---|---|---|
| 7,108,445 B2 * | 9/2006 | Henriques | A47G 29/1216 248/160 |
| 7,333,148 B2 | 2/2008 | Chang et al. | |
| 7,379,030 B1 * | 5/2008 | Lier | H01Q 13/00 343/772 |
| 7,439,932 B2 | 10/2008 | Lin | |
| 7,773,038 B2 | 8/2010 | Degner et al. | |
| 7,832,695 B2 * | 11/2010 | Ebel | E01F 9/0175 248/156 |
| 7,880,678 B2 | 2/2011 | Degner et al. | |
| 7,911,397 B2 | 3/2011 | Degner et al. | |
| 7,999,748 B2 | 8/2011 | Ligtenberg et al. | |
| 8,480,043 B1 * | 7/2013 | Ventura | B65F 1/141 248/156 |
| 8,581,788 B2 | 11/2013 | Degner et al. | |
| 8,698,695 B2 * | 4/2014 | Wyckoff | H01Q 1/085 343/878 |
| 2005/0057397 A1 * | 3/2005 | Ryken, Jr. | H01Q 1/40 343/700 MS |
| 2005/0093762 A1 | 5/2005 | Pick | |
| 2008/0067299 A1 * | 3/2008 | Ebel | E01F 9/0175 248/145 |
| 2010/0116192 A1 | 5/2010 | Avery et al. | |
| 2014/0292605 A1 * | 10/2014 | Roberts | H01Q 13/20 343/781 CA |
| 2015/0280317 A1 * | 10/2015 | Morin | H01Q 1/38 343/795 |

* cited by examiner

RESILIENT ANTENNA MAST

FIELD OF THE INVENTION

This disclosure relates to a resilient antenna mast.

BACKGROUND

Certain wireless systems (e.g., wireless soil sensor systems) used for data communications (e.g., soil moisture sensor data) in agricultural fields may use radio frequency or microwave antennas mounted lower than an average crop height or crop canopy. Antennas can be mounted lower than the average crop height or crop canopy or antennas can be removed from the field prior to performing certain agricultural tasks to avoid damage from irrigation systems (e.g., mobile pivot irrigation systems), sprayers or other agricultural equipment. Because certain prior art antennas are mounted lower than the average crop height or crop canopy and are susceptible to attenuation from terrain, crops, and other vegetation, the propagation of wireless signals may be unreliable between one or more communication devices in the field and a central or remote location (e.g., farmer's office computer system). Sometimes, it is not cost effective to remove antennas prior to performing routine agricultural tasks and reinstall the antennas after the routine agricultural task is complete. Thus, there is a need for an antenna system that increases the reliability of wireless signal propagation for agricultural fields and other work areas.

SUMMARY

In one embodiment, an antenna system comprises a lower mast member that has a first transverse member mounted in an interior of the lower mast member. An upper mast member has a second transverse member mounted in the interior of the upper mast member. A resilient member establishes a movable connection between the lower mast member and the upper mast member, in which the upper mast member can form a pivot angle with respect to the lower mast member. The resilient member is secured or retained axially by the first transverse member and the second transverse member.

DETAILED DESCRIPTION OF EMBODIMENT(S)

Figure 1:
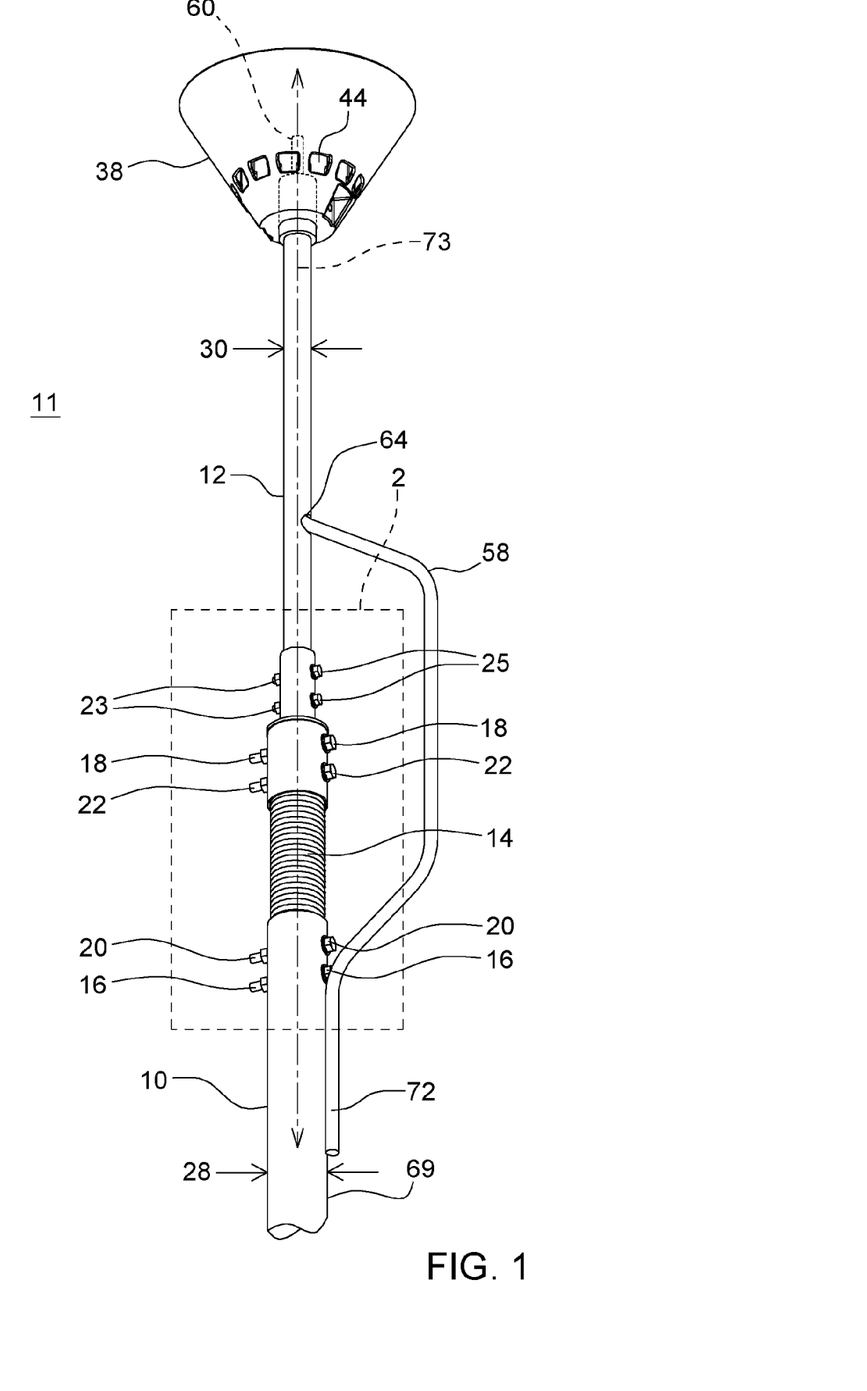
FIG. 1 illustrates a side view of one embodiment of an antenna system in a rest state in accordance with the disclosure.

FIG. 1 illustrates one embodiment of an antenna system 11 for wireless data communications or wireless stations, which can be used to transmit and receive electromagnetic signals (encoded or modulated with data or information) in an agricultural field or another outdoor work area. The antenna system 11 may be used in agricultural fields and other outdoor work areas, such as construction sites, forestry harvesting sites, turf monitoring sites, garden monitoring sites, open-pit mines, underground water-well monitoring sites, surface water monitoring sites, and oil-well monitoring sites, and weather station sites, among other possibilities. For example, the antenna system 11 may be used for one or more weather stations or soil sensing stations within an agricultural field that report wirelessly to a central or master station.

Figure 5:
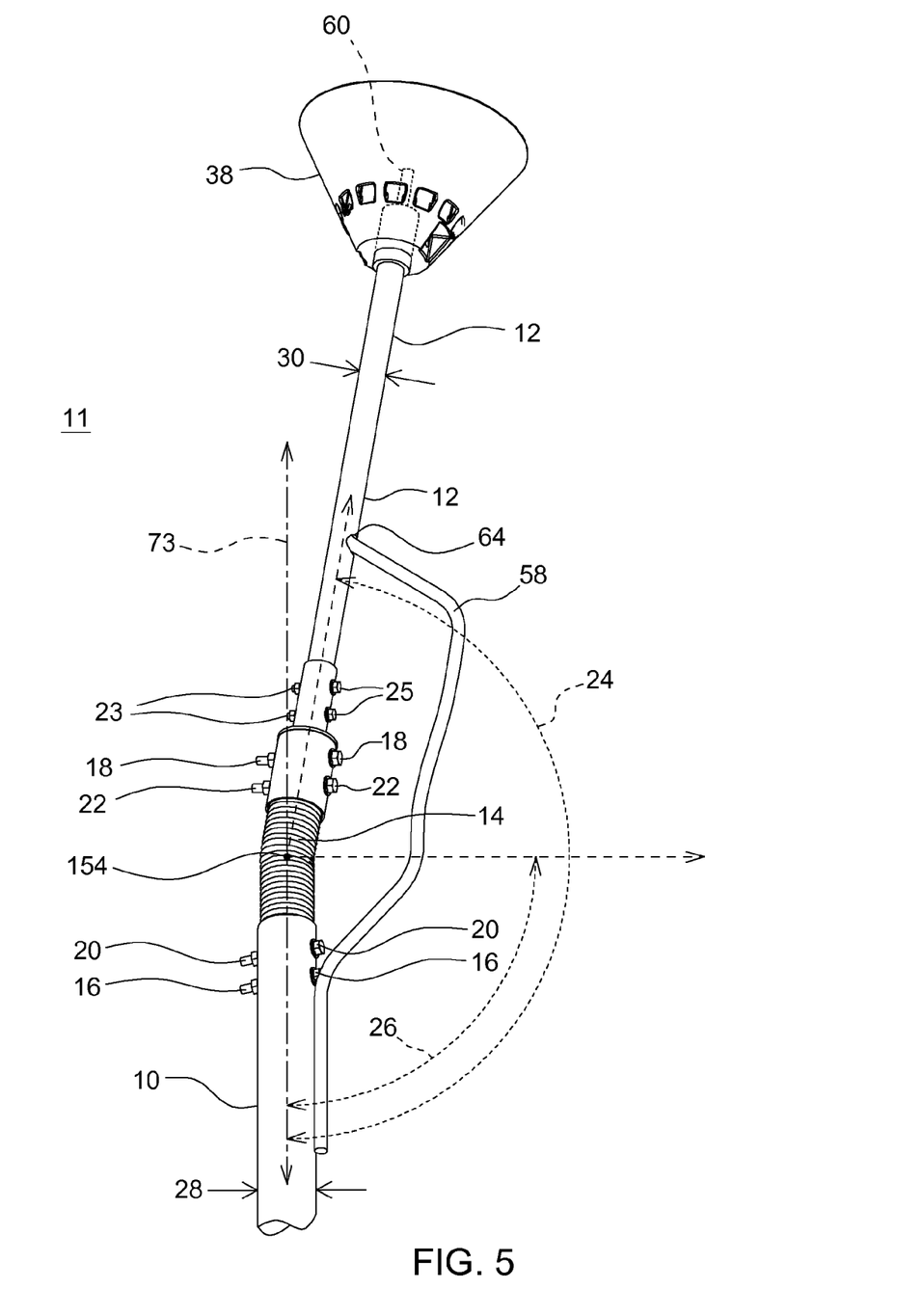
FIG. 5 illustrates a side view of one embodiment of an antenna system of FIG. 1 in a flexed state in accordance with the disclosure.

In accordance with one embodiment of the antenna system 11, the antenna system 11 of FIG. 1 and FIG. 5 comprises a lower mast member 10 that has a first transverse member 16 mounted in an hollow core 67 (FIG. 2A) of the lower mast member 10. An upper mast member 12 has a second transverse member 18 mounted in the hollow core 67 of the upper mast member 12. A resilient member 14 is adapted to support resiliently (and flexibly) the upper mast member 12. In one embodiment, the resilient member 14 is adapted to movably connect the lower mast member 10 to the upper mast member 12. For example, the resilient member 14 is capable of supporting a movable connection between the lower mast member 10 and the upper mast member 12, in which the upper mast member 12 can form a pivot angle 24 (FIG. 5) with respect to the lower mast member 10. For example, the resilient member 14 movably or pivotally connects the upper mast member 12 and the lower mast member 10. The resilient member 14 is secured or retained axially by the first transverse member 16 and the second transverse member 18. In one embodiment, the resilient member 14 comprises a spring-loaded flexible joint, where the flexible joint allows multi-directional movement of the upper mast member 12 with respect to a pivot point 154 or a lower mast member 10 at a pivot angle 24, such a single pivot angle, a compound pivot angles, or a multi-dimensional angles (e.g., roll angle, tilt angle, and yaw angle).

In one embodiment, the lower mast member 10 comprises a metallic cylindrical tube, pipe, conduit or electrical metallic tubing (EMT). For example, the lower mast member 10 comprises a substantially tubular member selected from the group of a metallic cylindrical tube, pipe, plastic pipe, polymeric pipe, composite pipe, conduit or electrical metallic tubing (EMT). In one embodiment, a bottom end 69 of the lower mast member 10 is anchored or secured in the ground via a stake, or immersed or submerged in cement, sand, gravel or other material to anchor or retain the lower mast member 10 with respect to the ground.

In alternate embodiments, the lower mast member 10 may have a substantially rectangular, triangular, elliptical, cylindrical (e.g., solid or hollow), or other suitable cross-sectional shape. The lower mast member 10 may be constructed from metal, an alloy, a plastic, a polymer, a composite material, a resin matrix with a filler, a fiber-filled plastic, or a fiber-filled polymer, for example. The fiber may comprise carbon fiber, fiber glass or another suitable filler.

In one embodiment, the upper mast member 12 comprises a polymer tube, a plastic tube, a composite tube composed of a resin matrix and a filler, a composite tube composed a resin and a fiber, or a fiberglass tube. For example, the upper mast member 12 comprises a substantially tubular member selected from the group consisting of a polymer tube, a plastic tube, a composite tube composed of a resin matrix and a filler, a composite tube composed a resin and a fiber, or a fiberglass tube. The upper mast member 12 may be made from a composite material, a resin matrix with a filler, a fiber-filled plastic, or a fiber-filled polymer, for example. The filler may comprise glass fiber, carbon fiber, boron fiber, ceramic particles, metal particles, or other materials. The fiber may comprise carbon fiber, fiber glass or another suitable filler.

In an alternate embodiment, the upper mast member 12 comprises a metallic cylindrical tube, pipe, conduit or electrical metallic tubing (EMT).

In alternate embodiments, the upper mast member 12 may have a substantially rectangular, triangular, elliptical, cylindrical (e.g., solid or hollow) or other suitable cross-sectional shape. In some alternate embodiments, the upper mast may be elastically deformable.

In certain configurations, the lower mast member 10 has a greater first diameter 28 (or first circumference) than a second diameter 30 (or second circumference) of the upper mast member 12. Conversely, the upper mast member 12 has a lesser second diameter 30 than the first diameter 28 of the lower mast member 10. However, in other configurations the lower mast member 10 and the upper mast member 12 may have approximately or substantially the same diameters (28, 30) or circumferential dimensions (e.g., inner diameter, outer diameter or both for cylindrical mast members). If the lower mast member 10 and the upper mast member 12 have different diameters (28, 30), they may be coupled together via a collar or adaptor 23 and one or more fasteners 25, whereas the adaptor 23 may be omitted (as in FIG. 3A in favor of a direct connection between the lower mast member 10 and the upper mast member 12 via resilient member 14) if the lower mast member 10 and the upper mast member 12 have approximately the same diameter (130, 28 in FIG. 3A) or same circumferential dimensions.

In one configuration, upper mast member 12, the lower mast member 10, or both in combination, have a length or mast height that is equal to or greater than the average crop height or the maximum crop height of a particular crop in the field. In another configuration, the antenna system 11 has a height of approximately 5 to 7 feet (approximately 1.52 meters to 2.13 meters) for corn or maize, and a height of approximately 2 to 4 feet (approximately 0.61 to 0.122 meters) for soybeans.

An antenna 60 or antenna element is coupled to a transmission line 58 that is secured to the hollow core 67 or exterior of the upper mast member 12, or routed within the interior of the upper mast member 12. As illustrated, the transmission line 58 may comprise a coaxial cable that is fed through an upper opening 64 in the upper mast member 12 for electrical and mechanical connection to the antenna 60.

In an alternate embodiment, the transmission line 58 may comprise a coaxial cable that is fed through an optional lower opening in the lower mast member 10, through the hollow core 67 (e.g., generally cylindrical hollow chamber). The optional lower opening and the upper opening 64 communicate with the hollow core 67 to retain and allow the transmission line 58 to be routed through the hollow core 67 of the resilient member 14, the lower mast member 10, the upper mast member 12, or any combination of the foregoing items.

The lower end 72 of the transmission line 58 may terminate in a coaxial cable connector, for example. The transmission line 58 may be held captive by the central hollow core 67 of the lower mast member 10, the upper mast member 12, or both. Although the upper mast member 12 has a hollow core 67 as shown in FIG. 1 to receive the transmission line 58, in an alternate embodiment the upper mast member 12 may have a solid core and the transmission line 58 may be secured to an outside of the upper mast member 12 (e.g., via clamps, connectors, cable ties).

In one embodiment, the antenna 60 comprises a monopole antenna, with or without a ground plane. The antenna 60 is protected by dielectric guard 38 or radome, which may feature openings 44. In an alternative embodiment, the antenna 60 may comprise a dipole element. In yet another alternative embodiment, the antenna 60 comprises a co-linear array of stacked monopole or dipole elements. In still another alternative embodiment, the antenna comprises a yagi antenna or corner reflector antenna. For example, the antenna 60 may comprise a commercially available WiFi, satellite, or cellular band antenna.

Figure 2A:
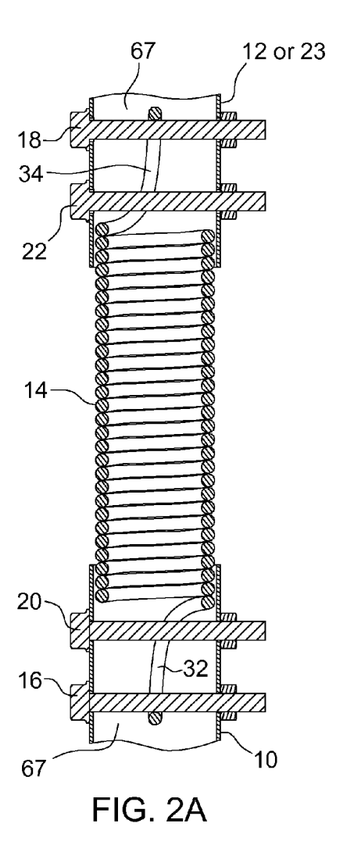
FIG. 2A is a first side view of an enlargement of region 2 in FIG. 1 to illustrate a cross-section of the resilient member and a portion of the antenna system.
Figure 2B:
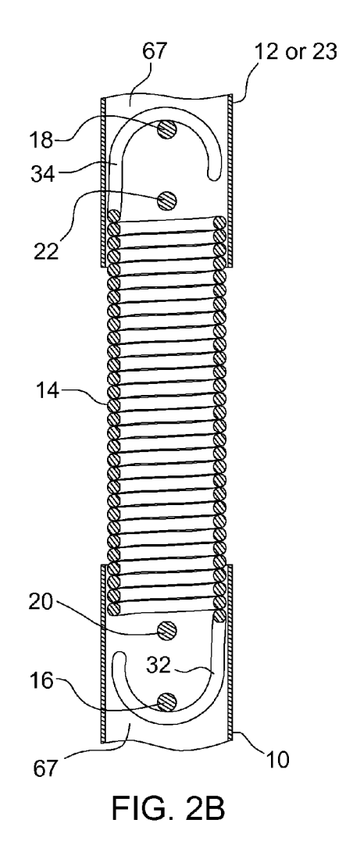
FIG. 2B is a second side view of a cross-section of the resilient member that represents an enlargement of region 2 in FIG. 1, where the antenna system is rotated from FIG. 2A.
Figure 2C:
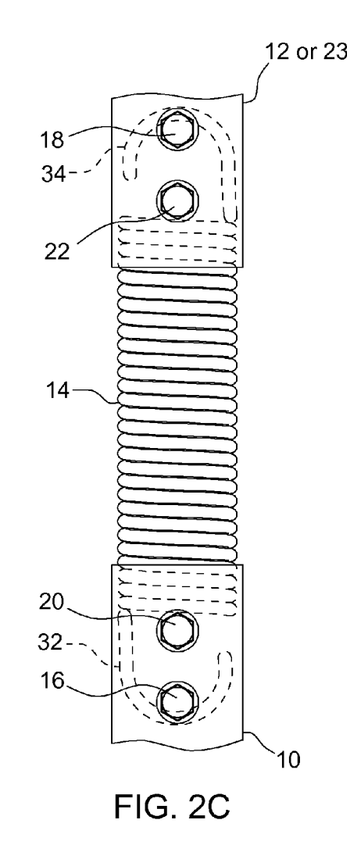
FIG. 2C illustrates a third side view of the resilient member that represents an enlargement of region 2 in FIG. 1, where the antenna system is rotated from FIG. 2B.

As best illustrated in FIG. 2A through FIG. 2C, inclusive, the lower mast member 10 has a first transverse member 16 mounted in a hollow core 67 or interior of the lower mast member 10; an upper mast member 12 has a second transverse member 18 mounted in a hollow core 67 or the interior of the upper mast member 12. Further, the lower mast member 10 has a third transverse member 20 mounted in the hollow core 67 or interior. The third transverse member 20 limits an axial extension of the resilient member 14 axially downward within an interior or the lower mast member 10. The upper mast member 12 further has a fourth transverse member 22 mounted in the hollow core 67 or interior. The fourth transverse member 22 limits the axial extension of the resilient member 14 upward within an interior of the upper mast member 12.

In one embodiment, the resilient member 14 comprises a spring (e.g., helical coil spring) that terminates in a first hook 32 at one end of the spring and a second hook 34 an opposite end of the spring. The first transverse member 16 engages the first hook 32 and the second transverse member 18 engages the second hook 34.

The resilient member 14 or spring may comprise a helical coil spring or coil spring that is constructed of steel, spring steel, or another suitable alloy. In one embodiment, the resilient member 14 or spring is selected to have a lateral resilience and vertical resilience, or a first equivalent spring constant, that supports the mass of the upper mast member 12 and the dielectric guard 38: (a) when no lateral external force or wind is applied, or (b) when a certain maximum lateral external force or maximum wind is applied to the dielectric guard 38 or upper mast member 12.

In an alternate embodiment, the resilient member 14 may comprise an elastomer (e.g., an elastomeric ring, loop, band, belt or chain), the combination of a spring and an elastomer, or another elastically deformable and resilient member.

Figure 3A:
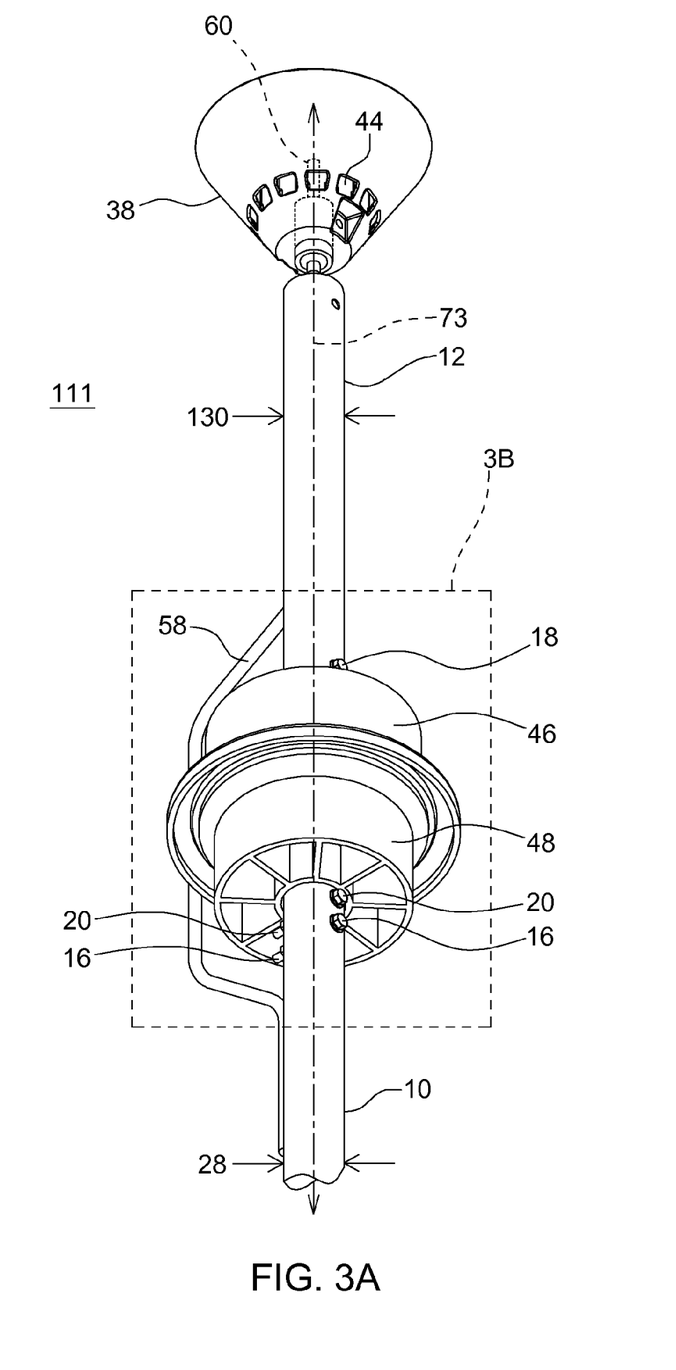
FIG. 3A illustrates an alternate embodiment of an antenna system in a rest state in accordance with the disclosure.
Figure 3B:
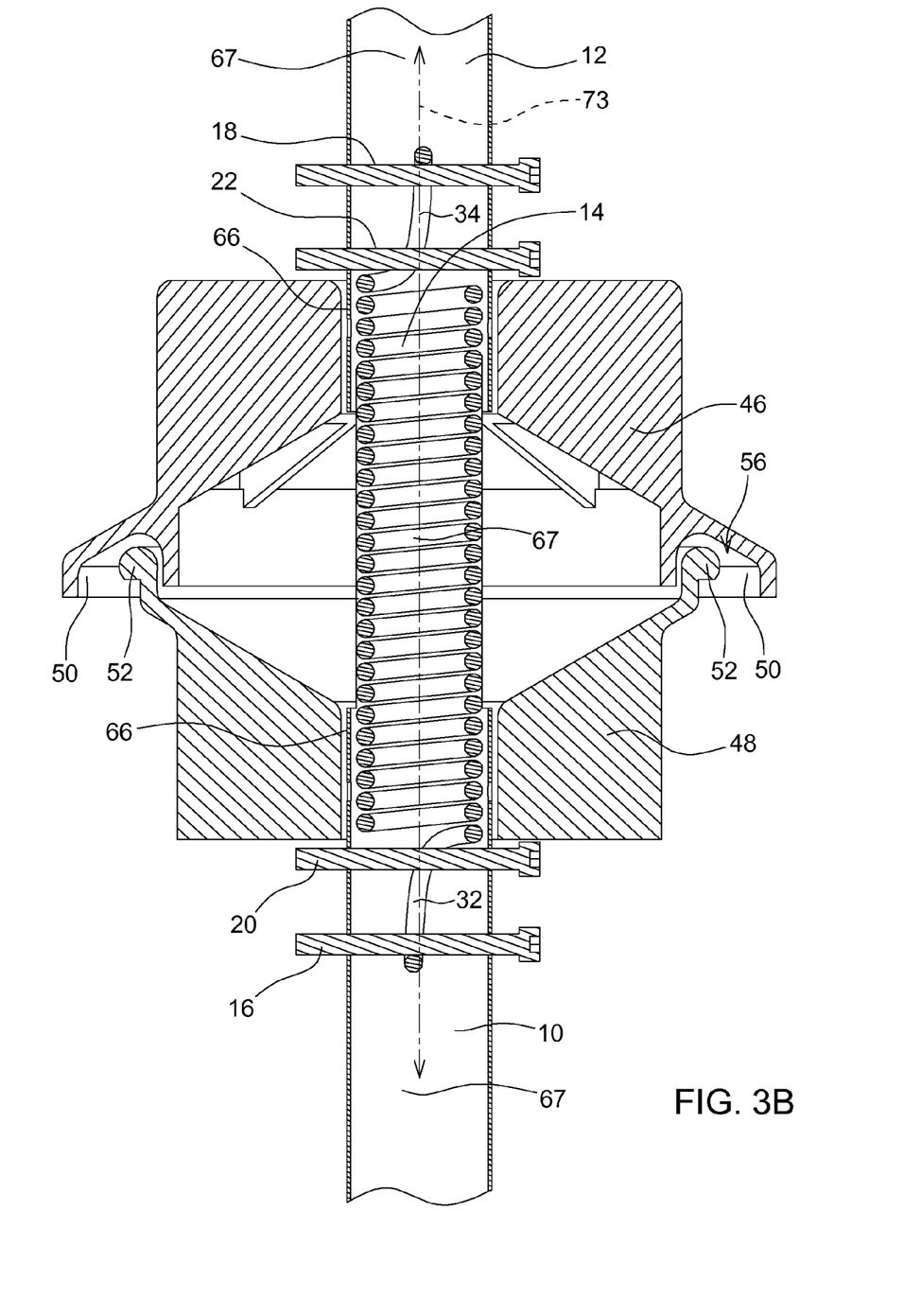
FIG. 3B illustrates a side cross sectional view of an enlargement of region 3B in FIG. 3A in which the antenna system is in a rest state.
Figure 3C:
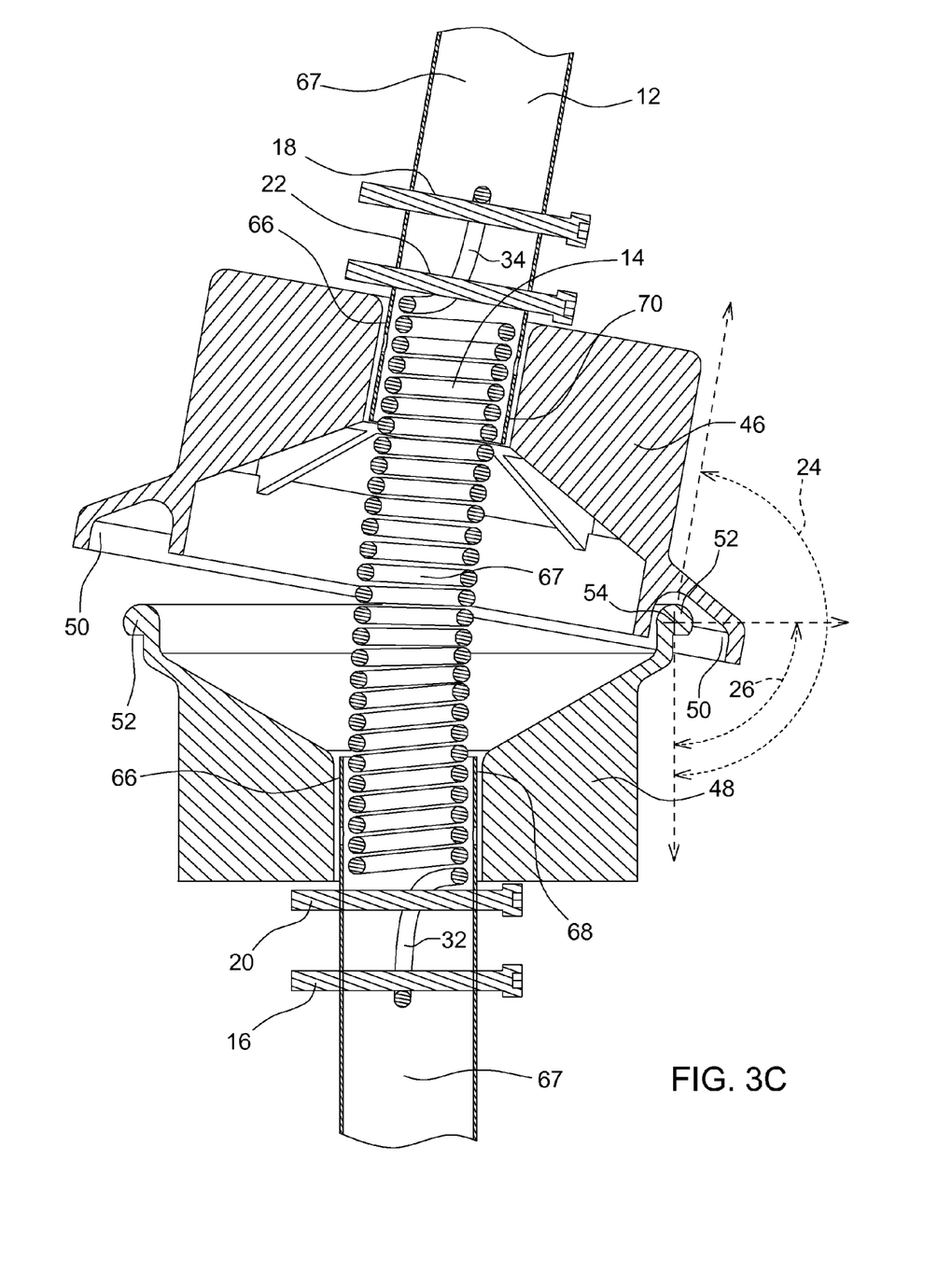
FIG. 3C illustrates a side cross sectional view of an enlargement of region 3B in FIG. 3A in which the antenna system is in a flexed state.

FIG. 3A and FIG. 3B illustrate an alternate embodiment of an antenna system 111 in a rest state in accordance with the disclosure. FIG. 3C illustrates the alternative embodiment of the antenna system 111 of FIG. 3A in a flexed state. FIG. 3B and FIG. 3C show an enlargement of region 3B of FIG. 3A. The antenna system 111 of FIG. 3A through FIG. 3C, inclusive, is similar to the antenna system 11 of FIG. 1 and FIG. 5, except the antenna system 111 further comprises a first guide 46 and a second guide 48. As illustrated in FIG. 3A through FIG. 3C, inclusive, the second diameter 130 of upper mast member 12 may be substantially the same size or dimension as the first diameter 28 of the lower mast member 10, although in other configurations the upper mast member 12 may have a larger or smaller diameter or cross-section than that of the lower mast member 10. Like reference numbers in FIG. 1, FIG. 3A, FIG. 3B, and FIG. 3C indicate like elements.

As illustrated in FIG. 3A, FIG. 3B, and FIG. 3C, the antenna system 11 may comprise a first guide 46 mounted radially outward from the resilient member 14 and the upper mast member 12. The first guide 46 is mounted or capable of mounting on the upper mast member 12 via a central opening 66 in the first guide 46. The first guide 46 has a first mating portion 50. As illustrated in FIG. 3A, FIG. 3B, and FIG. 3C the first mating portion 50 comprises one or more of the following: (a) a substantially annular channel or groove, (b) a substantially annular channel that is sloped radially upward toward a central axis 73 of the upper mast member 12, or (c) a concave recess that is substantially annular.

A second guide 48 is mounted radially outward from the resilient member 14 and the lower mast member. The second guide 48 is mounted or capable of mounting on the lower mast member 10 via a central opening 66 in the second guide 48. The second guide 48 has a second mating portion 52. As illustrated in FIG. 3A and FIG. 3B, the second mating portion 52 comprises one or more of the following: (a) a substantially annular lip, where the lip has a rounded, chamfered, or (b) convex projecting surface (e.g., convex bead or convex rounded edge) that is substantially annular.

In an alternate embodiment, the first guide 46 and the second guide 48 can be mounted in reverse, on the opposite mast members (10, 12) to achieve similarly or substantially the same functionality of the combination of the first guide 46 and the second guide 38 described in this disclosure.

In one or more embodiments, the first mating portion 50 is adapted to receive and interlock, partially or completely, with the second mating portion 52 along all or part of a circumferential region 56 in a rest state or rest mode of the antenna system 111. Further, the first mating portion 50 can interlock (at least partially) with the second mating portion 52 along an arc portion 54 (or pivot point that is spatially coincidental with the arc portion) of the entire circumferential region 56 in a flexed state (or transient, elastically deformed state) or flexed mode of the upper mast member 12 with respect to the lower mast member 10. In the flexed state, the upper mast member 12 makes a pivot angle 24 with respect to the lower mast member 10. As illustrated, the rest state coincides with a one hundred and eighty degree pivot angle 24. In practice, the pivot angle 24 is generally limited to a maximum pivot angle 26 (e.g., approximately 90 degrees as illustrated in FIG. 3C) where the arc portion 54 facilitates a return of the first mating portion 50 and the second mating portion 52 to a rest state (e.g., equilibrium position) or to substantial interlocking alignment for the rest state.

In one embodiment, a flexible joint comprises the resilient member 14, the first guide 46 and the second guide 48, where the first guide 46 and the second guide 48 mount to the upper mast member 12 and the lower mast member 10, respectively or vice versa. Although the first guide 46 can have a bell-shaped exterior or substantially conical exterior, the first guide 46 may have any other suitable shaped exterior. Similarly, although the second guide 48 may have bell shaped exterior or substantially conical exterior, the second guide 48 may have any other suitable shaped exterior. In certain embodiments, the first guide 46 and the second guide 48 may be of a size and shape that is capable of mounting on the ends (68, 70) of the lower mast member 10 and the upper mast member 12, respectively. For example, the upper mast member 12 and the lower mast member 10 may fit standard pipe or electrical metallic conduit sizes. The first guide 46 and the second guide 48 each have a central opening 66 to receive the lower mast member 10, the upper mast member 12, or both. Within the central opening 66, the resilient member 14 is positioned radially inward from the first guide 46 and the second guide 48. The central opening 66 supports the passage of the resilient member 14, cables, transmission line 58, wire, or coaxial cable.

In the rest state, the first guide 46 and the second guide 48 are interlocked or in contact at the mating surfaces (50, 52). The first guide 46 and the second guide 48 are stacked end-to-end. For example, the first mating portion 50 and second mating portion 52 52 are interlocked to trap, secure or stabilize the upper mast member 12 with respect to the lower mast member 10 in generally vertical orientation with respect to the ground or to maintain a substantially linear vertical axis 73 with respect to the resilient member 14, the upper mast member 12 and the lower mast member 10 (e.g., for application of less than a critical lateral force to the upper mast member 12 or dielectric guard 38). The flexible joint is generally stable and constrained, but capable of movement of the upper mast member 12 with respect to the lower mast member 10 at a pivot point (e.g., 54 or 154) about the flexible joint (e.g. in response to application of equal to or greater than a critical lateral force to the upper mast member or dielectric guard 38).

In the flexed state, if the upper mast member 12 is displaced laterally off of its concentric axis (e.g., vertical axis 73) with respect to the lower mast member 10, an outboard pivot point 54 (FIG. 3C) is created between the first mating portion 50 and the second mating portion 52 (e.g., the convex bead-concave ring interface). In the flexed state, the resilient member 14 (e.g., helical extension spring) is stretched or extended about this outboard pivot point 54 (in contrast to the inboard pivot point 54 of FIG. 5) creating a larger moment arm and greater restoring torque than would otherwise exist in the absence of the flexible joint or the first guide 46 and the second guide 48. The resilient member 14 (e.g., extension spring) holds the flexible joint in place as the flexible joint is flexed. The resilient member 14 (e.g., extension spring) provides curved clear (unobstructed) interior passage for transmission line 58 wire, cable, coaxial cable, even as the joint is positioned or flexed to a maximum pivot angle 26 (e.g., approximately ninety (90) degrees). The resilient member 14 attaches to mast members on each end (e.g., at or near hooks 32, 34) of the flexible joint assembly and provides a retaining force which holds the antenna system 111 together.

In an alternate embodiment, for improved manufacturing and assembly, the first guide 46 and the second guide 48 may comprise identical conical members (e.g., clam shells) that mate at a first mating portion 50 and a second mating portion 52 that are generally annular.

By choosing different spring constants or spring parameters of the resilient member 14, the flexible joint and the restoring torque to the rest state can be tailored to the size, mass and wind-loading of the antenna system (11 or 111) above the flexible joint, including the upper mast member 12, the dielectric guard 38 and any antenna 60 within the dielectric guard 38.

Figure 4A:
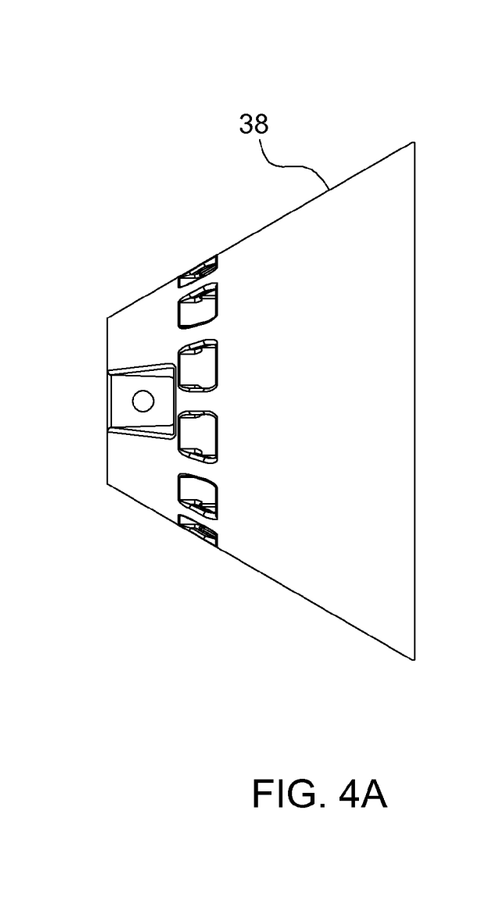
FIG. 4A illustrates a side view of a dielectric guard that is removed from the antenna system.
Figure 4B:
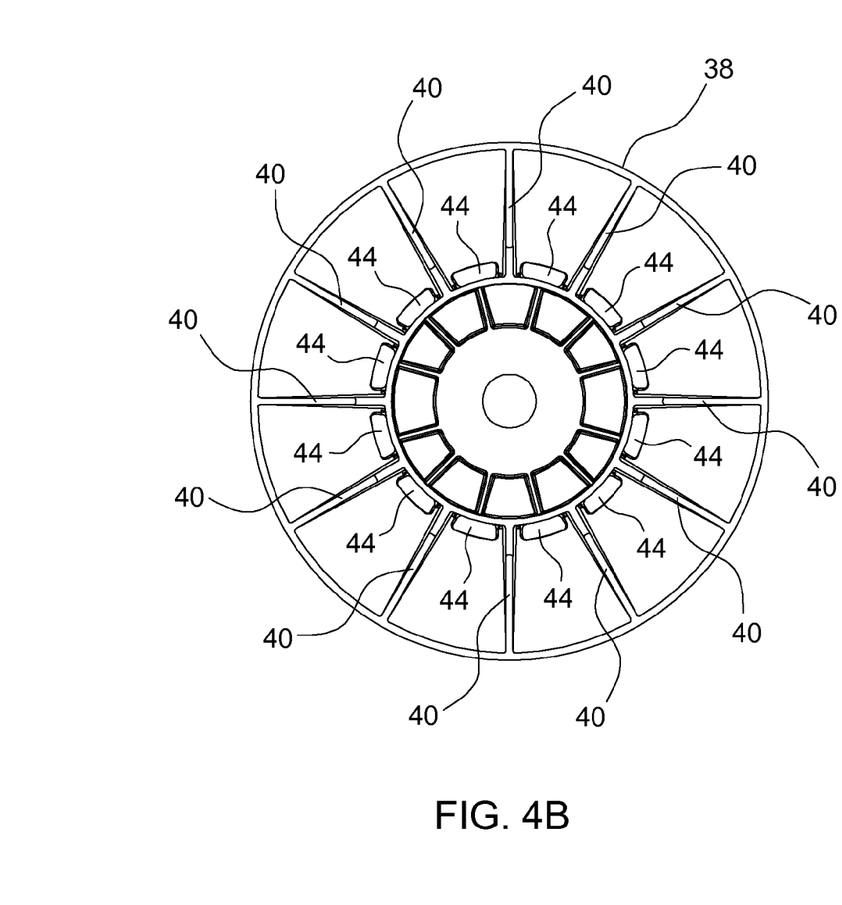
FIG. 4B illustrates a top view of the dielectric guard that is removed from the antenna system.
Figure 4C:
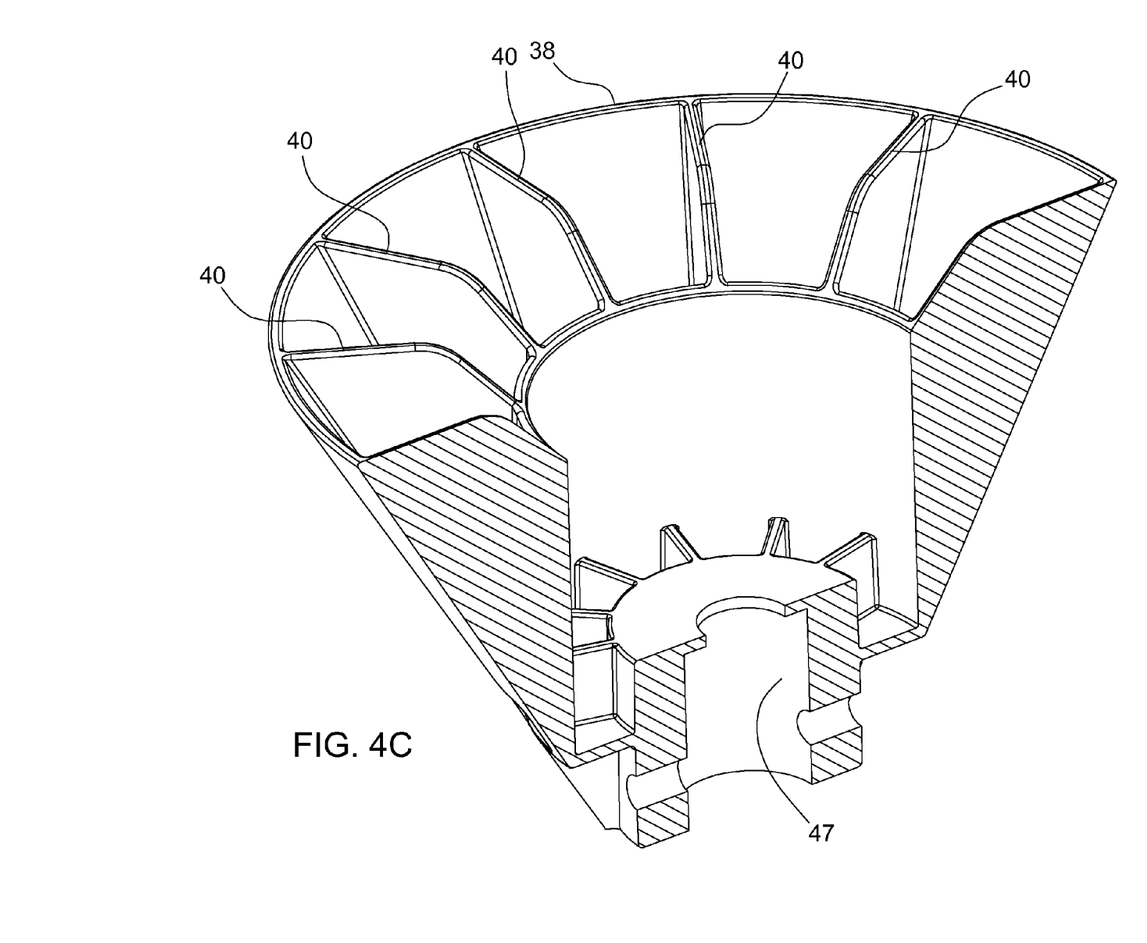
FIG. 4C illustrates side cross-sectional view of the dielectric guard that is removed from the antenna system.

In certain configurations of the antenna system (11 or 111), a dielectric guard 38 is mounted at or near a top of the upper mast member 12 via a central recess 47 (FIG. 4C) in the dielectric guard 38. As illustrated in FIG. 4A through 4C, inclusive, the dielectric guard 38 comprises a substantially conical deflector that has radial ribs 40 in its interior to reinforce the structure of the dielectric guard 38 and distribute external stresses from striking objects or being struck by such objects. The dielectric guard 38 comprises a substantially conical deflector that has one or more openings 44 between the interior and an exterior to allow precipitation or water to drain from inside the substantially conical deflector.

The dielectric guard 38 may be molded from nylon, polyethylene with an ultraviolet inhibiter, polymethyacrylate, or any plastic or polymer material with adequate resistance to ultraviolet radiation and adequate impact resistance.

FIG. 1 illustrates the antenna system 11 in a rest state and in an flexed state, which is shown in FIG. 5. In the rest state, the resilient member 14, the upper mast member 12, the lower mast member 10, resilient member 14, and antenna system 11 are oriented generally vertically with respect to the ground or in alignment with vertical axis 73. In the rest state, the upper mast member 12 and the lower mast member 10 are oriented substantially linearly and vertically to each other along linear vertical axis 73, where the pivot angle 24 is approximately one hundred and eighty degrees. In the rest state, the resilient member 14 is has a lateral resilience, or spring constant, capable of supporting the mass of the upper mast member 12 in a substantially vertical manner with respect to the lower mast member 10.

FIG. 5 illustrates a side view of one embodiment of an antenna system 11 of FIG. 1 in a flexed state in accordance with the disclosure. In an flexed state, which is mutually exclusive to the rest state, the dielectric guard 38 or mast is contacted by a vehicle, machine, or object with greater than a critical force or threshold force. In the flexed state, the spring lateral resilience, or spring constant, is configured to allow the upper mast member 12 to move resiliently, generally elastically with respect to the lower mast member 10 about a pivot point 154 (e.g., inboard pivot point), without any material permanent deformation of the resilient member 14 (e.g., spring), the upper mast member 12, or the lower mast member 10. For example, when the dielectric guard 38 or upper mast member 12 is contacted by a vehicle, machine or object with greater than a threshold force, the spring lateral resilience and vertical resilience (of the resilient member 14) is configured to allow the upper mast member 12 to move resiliently with respect to the lower mast member 10, without permanent deformation of the resilient member 14. In any flexed state, the antenna system 11 dissipates or dampens the mechanical energy from the contact of the vehicle, machine, or object to return to the rest state (without material permanent deformation of the resilient member 14) where the lower mast member 10, the upper mast member 12, the resilient member 14, antenna 60, and dielectric guard 38 are aligned in a substantially vertical manner with respect to the ground or with respect to a linear vertical axis 73 to provide a target reception and transmission radiation pattern (e.g., half-power bandwidth) of the antenna 60 in a vertical plane, horizontal plane, or both. In a flexed state, the resilient member 14 provides a restoring torque with dampening to restore the antenna 60 to a rest state.

In FIG. 5, the pivot point 154 (e.g., inboard pivot point) can vary in its vertical position along the length of the resilient member 14, whereas in FIG. 3C the outboard pivot point 54 is established at a known vertical position (but at any point radially about the circumference or circumferential region 56 in a generally horizontal plane) coincident with the arc portion 54 of the interface between the first guide 46 and the second guide 48. As illustrated in FIG. 3B and FIG. 3C, the known vertical position of the pivot point 54 can be approximately in the middle or intermediate axial portion of the resilient member 14. Accordingly, the outboard pivot point 54 establishes a limited range of motion of the antenna system 111 in the flexed state, where the spring constant for the resilient member 14 can be selected from a potentially greater range of spring constants, such that the antenna system 111 can be deflected or in a flexed state in response to a target or tailored triggering impact force (e.g., a lesser triggering impact force of a vehicle or object than otherwise possible) than the antenna system 11 of FIG. 1 and FIG. 5.

Any embodiments of the antenna system disclosed in this document are well-suited for placement in an agricultural field where the boom of a sprayer or other agricultural equipment might strike the dielectric guard or the upper mast member. Accordingly, in an flexed state the antenna system resiliently deflects downward when contacted by the boom, object or other agricultural equipment and then later returns to a rest state where the upper mast member is maintained in a generally vertical position with respect to lower mast member. If the upper mast member is rigid, it is displaced when struck by a vehicle, irrigation equipment or other object and then automatically restores to the upright condition (by spring action) as object passes by. In certain embodiments, the resilient member provides a flexible joint that allows the upper mast member to bend up to a maximum angle (e.g., approximately ninety (90) degrees) in any direction with respect to the lower mast member. The antenna system is well-suited for placing the antenna above the crop canopy or maximum crop height to avoid attenuation of the transmitted or received signal from the crop, among other things such as the surrounding terrain or other obstructions. The antenna system can facilitate reliable communications between one or more stations located in the field and a remote or central location of the grower, agronomist, or manager of the agricultural or other work operation.

Having described the preferred embodiment, it will become apparent that various modifications can be made without departing from the scope of the disclosure as defined in the accompanying claims.

The following is claimed:

1. An antenna system comprising:
    a lower mast member having a first transverse member mounted in an interior of the lower mast member;
    an upper mast member having a second transverse member mounted in the interior of the upper mast member; and
    a resilient member for establishing a movable connection between the lower mast member and the upper mast member, in which the upper mast member can form a pivot angle with respect to the lower mast member; wherein the resilient member is secured or retained axially by the first transverse member and the second transverse member; wherein the lower mast member further comprises a third transverse member and wherein the upper mast further comprises a fourth transverse member; the third transverse member limiting an axial extension of the resilient member axially downward within the lower mast member and the fourth transverse member limiting the axial extension of the resilient member upward within the upper mast member.

2. The antenna system according to claim 1 wherein the lower mast member comprises a metallic cylindrical tube, pipe, conduit or electrical metallic tubing (EMT).

3. The antenna system according to claim 1 wherein the upper mast member comprises a polymer tube, a plastic tube, a composite tube composed of a resin and a filler matrix, a composite tube composed a resin and a fiber, or a fiberglass tube.

4. The antenna system according to claim 1 wherein the lower mast member has a greater diameter than the upper mast member.

5. The antenna system according to claim 1 wherein the resilient member comprises a spring that terminates in a first hook at one end of the spring and a second hook an opposite end of the spring, and wherein first transverse member engages the first hook and the second transverse member engages the second hook.

6. The antenna system according to claim 1 wherein a dielectric guard is mounted at or near a top of the upper mast member.

7. The antenna system according to claim 6 wherein the dielectric guard comprises a substantially conical deflector having radial ribs in its interior.

8. The antenna system according to claim 6 wherein the dielectric guard comprises a substantially conical deflector having one or more openings between the interior and an exterior to allow precipitation or water to drain from inside the substantially conical deflector.

9. The antenna system according to claim 1 further comprising:
a first guide mounted radially outward from the resilient member and the upper mast member, the first guide having a first mating portion;
a second guide mounted radially outward from the resilient member and the lower mast member, the second guide having a second mating portion, wherein the first mating portion interlocks with the second mating portion along some part of or the entire circumferential region in a rest state of the antenna system and wherein the first mating portion interlocks with the second mating portion along an arc portion of the entire circumferential region in a flexed state of the upper mast member with respect to the lower mast member.

10. The antenna system according to claim 9 wherein in the flexed state, the pivot angle is limited to a maximum pivot angle where the arc portion facilitates a return of the first mating portion and the second mating portion to substantial interlocking alignment for the rest state.

11. An antenna system comprising:
a lower mast member having a first transverse member mounted in an interior of the lower mast member;
an upper mast member having a second transverse member mounted in the interior of the upper mast member; and
a spring for establishing a movable connection between the lower mast member and the upper mast member, in which the upper mast member can form a pivot angle with respect to the lower mast member; wherein the spring is secured or retained axially by the first transverse member and the second transverse member, wherein the lower mast member further comprises a third transverse member and wherein the upper mast further comprises a fourth transverse member; the third transverse member limiting the axial extension of the spring axially downward within the lower mast member and the fourth transverse member limiting the axial extension of the spring upward within the upper mast member.

12. The antenna system according to claim 11 wherein the lower mast member comprises a metallic cylindrical tube, pipe, conduit or electrical metallic tubing (EMT).

13. The antenna system according to claim 11 wherein the upper mast member comprises a polymer tube, a plastic tube, a composite tube composed of a resin and a filler matrix, a composite tube composed a resin and a fiber, or a fiberglass tube.

14. The antenna system according to claim 11 wherein the lower mast member has a greater diameter than the upper mast member.

15. The antenna system according to claim 11 wherein the spring terminates in a first hook at one end of the spring and a second hook an opposite end of the spring, and wherein first transverse member engages the first hook and the second transverse member engages the second hook.

16. The antenna system according to claim 11 wherein a dielectric guard is mounted at or near a top of the upper mast member.

17. The antenna system according to claim 16 wherein the dielectric guard comprises a substantially conical deflector having radial ribs in its interior.

18. The antenna system according to claim 17 wherein the dielectric guard comprises a substantially conical deflector having one or more openings between the interior and an exterior to allow precipitation or water to drain from inside the substantially conical deflector.

19. The antenna system according to claim 11 further comprising:
a first guide mounted radially award from the spring and the upper mast, the first guide having a first mating portion;
a second guide mounted radially award from the spring and the lower mast, the second guide having a second mating portion, wherein the first mating portion interlocks with the second mating portion along some part or an entire circumferential region in a rest state of the antenna system and wherein the first mating portion interlocks with the second mating portion along an arc portion of the entire circumferential region in a flexed state of the upper mast member with respect to the lower mast member.

20. The antenna system according to claim 19 wherein in the flexed state, the pivot angle is limited to a maximum pivot angle where the arc portion facilitates a return of the first mating portion and the second mating portion to substantial interlocking alignment for the rest state.

* * * * *